(12) United States Patent
Schuette

(10) Patent No.: US 11,293,149 B2
(45) Date of Patent: Apr. 5, 2022

(54) STIFFENED SCREED EXTENDER TUBE

(71) Applicant: Caterpillar Paving Products Inc., Brooklyn Park, MN (US)

(72) Inventor: Ryan Schuette, Saint Michael, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 227 days.

(21) Appl. No.: 16/297,022

(22) Filed: Mar. 8, 2019

(65) Prior Publication Data

US 2020/0283970 A1 Sep. 10, 2020

(51) Int. Cl.
*E01C 19/42* (2006.01)
*E01C 19/48* (2006.01)

(52) U.S. Cl.
CPC .......... *E01C 19/42* (2013.01); *E01C 19/4873* (2013.01); *E01C 2301/16* (2013.01)

(58) Field of Classification Search
None
See application file for complete search history.

(56) References Cited

U.S. PATENT DOCUMENTS

| | | | | | |
|---|---|---|---|---|---|
| 3,845,577 | A | * | 11/1974 | Naymik | E01H 5/066 37/231 |
| 3,874,807 | A | * | 4/1975 | Puckett | E01C 19/4873 404/110 |
| 3,907,451 | A | * | 9/1975 | Fisher | E01C 19/4873 404/101 |
| 4,379,653 | A | * | 4/1983 | Brown | E01C 19/4853 404/104 |
| 4,682,908 | A | * | 7/1987 | Domenighetti | E01C 19/40 404/118 |
| 4,749,304 | A | * | 6/1988 | Craig | E01C 19/42 404/101 |
| 4,969,280 | A | * | 11/1990 | Thorneloe | E01H 5/067 37/105 |
| 5,203,642 | A | * | 4/1993 | Heller | E01C 19/40 404/118 |
| 5,222,829 | A | * | 6/1993 | Mogler | E01C 19/407 404/118 |

(Continued)

FOREIGN PATENT DOCUMENTS

| | | | |
|---|---|---|---|
| CN | 107587409 A | 1/2018 | |
| DE | 10337066 A1 * | 2/2004 | ............ E01C 19/48 |
| WO | WO-2016183632 A1 * | 11/2016 | ............ E01C 19/48 |

*Primary Examiner* — Thomas B Will
*Assistant Examiner* — Katherine J Chu
(74) *Attorney, Agent, or Firm* — von Briesen & Roper, s.c.

(57) ABSTRACT

A screed assembly for a paving machine may comprise a main screed having a frame with a fixed width, and an extension screed slidably connected to the main screed and configured to extend laterally from the main screed to a fully-extended position. The extension screed may include a deflector, an inner plate proximate a central axis of the main screed, and an outer plate opposite the inner plate. At least one extender tube may extend between, and may be fixed to, the inner plate and outer plate. Each extender tube may have a shell comprised of a first material with a second material disposed therein, the second material offering increased stiffness to the extender tube so as to restrict flexion of the extender tube when the extension screed is in a fully-extended position.

20 Claims, 4 Drawing Sheets

(56) References Cited

U.S. PATENT DOCUMENTS

| | | | | |
|---|---|---|---|---|
| 5,924,819 | A * | 7/1999 | Breidenbach | E01C 19/42 404/96 |
| 6,203,243 | B1 * | 3/2001 | Birtchet | E01C 19/42 404/104 |
| 6,354,024 | B1 * | 3/2002 | Kost | E01H 5/06 172/273 |
| 6,442,877 | B1 * | 9/2002 | Quenzi | E01H 5/065 37/281 |
| 7,195,423 | B2 * | 3/2007 | Halonen | E01C 19/42 404/84.5 |
| 7,676,962 | B2 * | 3/2010 | Schmeichel | E01H 5/061 37/232 |
| 8,128,314 | B2 * | 3/2012 | Buschmann | E01C 19/48 404/118 |
| 8,221,026 | B2 * | 7/2012 | Munz | E01C 19/48 404/96 |
| 8,776,405 | B2 * | 7/2014 | Paonessa | E01H 5/062 37/232 |
| 8,875,419 | B2 * | 11/2014 | Schmeichel | E01H 5/062 37/231 |
| 9,151,006 | B2 * | 10/2015 | Guggino | E02F 3/962 |
| 9,476,169 | B1 * | 10/2016 | Knapp | E01C 19/266 |
| 9,683,337 | B2 | 6/2017 | Ellwein et al. | |
| 10,106,942 | B2 * | 10/2018 | Roberge | E01H 5/061 |
| 10,472,780 | B1 * | 11/2019 | Wilson | E01C 19/405 |
| 10,794,015 | B2 * | 10/2020 | Schuette | E01C 19/48 |
| 2003/0226289 | A1 * | 12/2003 | Geerligs | E01H 5/06 37/268 |
| 2004/0079002 | A1 * | 4/2004 | Goy | E01H 5/063 37/231 |
| 2006/0179651 | A1 * | 8/2006 | Kachmar | G02B 6/4497 29/825 |
| 2006/0218822 | A1 * | 10/2006 | Hosmer | E01H 5/06 37/231 |
| 2006/0275079 | A1 * | 12/2006 | Wiker | E01C 19/4873 404/108 |
| 2007/0089327 | A1 * | 4/2007 | Watson | E01H 5/065 37/281 |
| 2007/0258769 | A1 * | 11/2007 | Eppes | E01C 19/48 404/118 |
| 2010/0150651 | A1 * | 6/2010 | Buschmann | E01C 19/48 404/82 |
| 2010/0209190 | A1 * | 8/2010 | Munz | E01C 19/48 404/118 |
| 2011/0002738 | A1 * | 1/2011 | Mahler | E01C 19/4833 404/118 |
| 2011/0305509 | A1 * | 12/2011 | Angermann | E01C 19/4873 404/118 |
| 2013/0298429 | A1 * | 11/2013 | Niemela | E01H 5/04 37/242 |
| 2014/0186115 | A1 * | 7/2014 | Graham | E01C 23/07 404/75 |
| 2014/0250740 | A1 * | 9/2014 | Supergan | E01H 5/065 37/281 |
| 2014/0328626 | A1 * | 11/2014 | Smieja | E01C 19/42 404/118 |
| 2015/0040441 | A1 * | 2/2015 | Nammensma | E01H 5/068 37/268 |
| 2017/0370051 | A1 * | 12/2017 | Comer | E01C 19/48 |
| 2019/0145063 | A1 * | 5/2019 | Jorgensen | E01C 19/48 404/118 |
| 2019/0177930 | A1 * | 6/2019 | Ramb | E01C 23/01 |
| 2020/0131727 | A1 * | 4/2020 | Larson | E01H 5/068 |

* cited by examiner

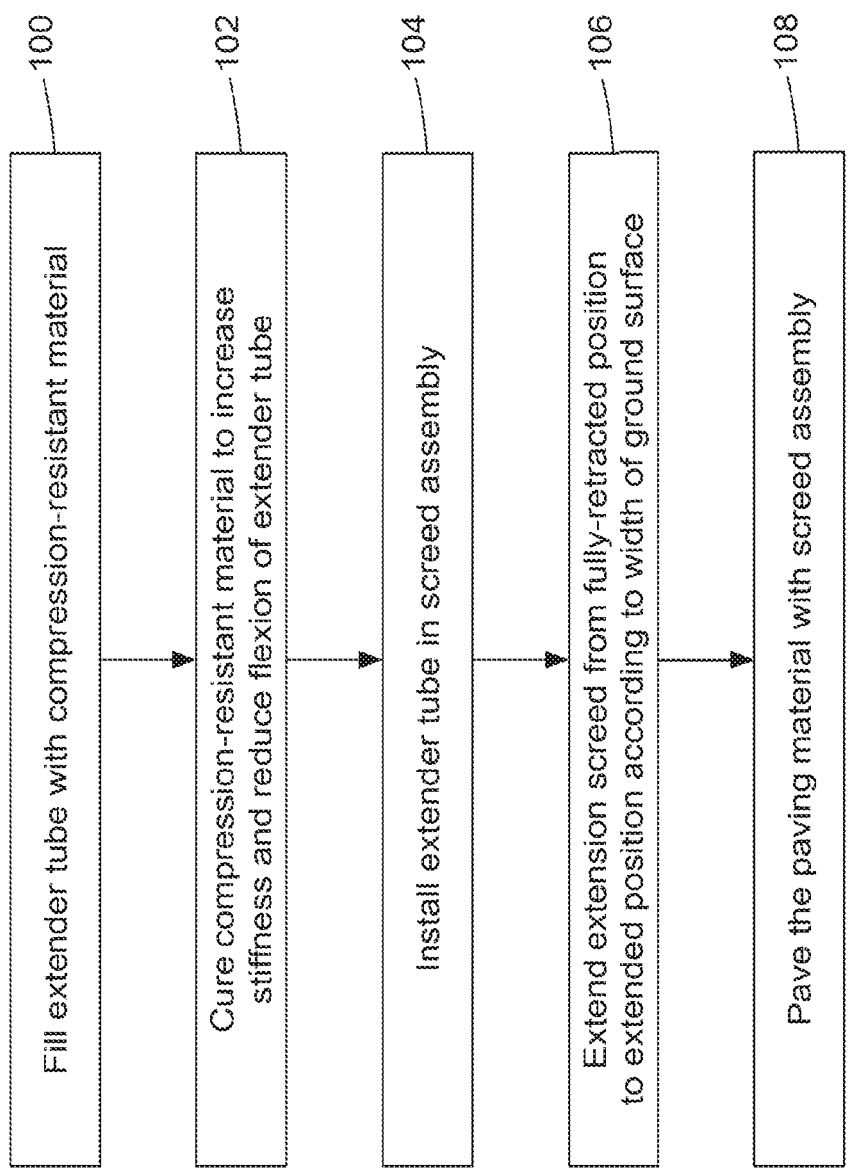

STIFFENED SCREED EXTENDER TUBE

TECHNICAL FIELD

The present disclosure relates generally to paving machines, and, more specifically, to extenders to screed assemblies for paving machines.

BACKGROUND

Paving machines are used to lay and level a paving material, such as asphalt, on a ground surface for the construction of roads, bridges, parking lots, and other such surfaces. In general, paving machines include a chassis, a hopper for storing the paving material, an auger that distributes the paving material on a ground surface, and a screed assembly that compacts and levels the paving material to a desired mat thickness. The screed assembly may be rear-mounted on the paving machine behind the hopper, the chassis, and the auger relative to the direction of travel. The screed assembly may include a main screed and one or more extension screeds mounted behind (or in front of) the main screed. The extension screeds are laterally extendable from the main screed to adjust for varying ground surface widths.

While effective, as the extension screeds laterally extend from the main screed, they are currently prone to vertical and fore/aft deflection. This is disadvantageous as it will necessarily diminish the uniformity of the asphalt being laid. Moreover, deflection or roll of the extension screeds will cause stability performance problems. As the screed extends, the extender will roll as it takes more load. The roll change will require operator input to maintain asphalt mat uniformity.

Prior art attempts to improve screed stiffness have only involved using thicker dimensioned extender tubes or plates, or simply using solid bar extender tubes. In addition to adding weight to the extension screed and paving machine, these designs also cost more to manufacture and operate. One example of a prior art paving machine in this regard is U.S. Pat. No. 4,379,653.

There is consequently a need for extension screed tube designs that resist deflection, roll and/or torsion when the extension screeds are in an extended position, but which are lighter, stiff and manufactured at a lower cost than conventional tubes.

SUMMARY

In accordance with one aspect of the present disclosure, a paving machine is disclosed. The paving machine may be configured for paving a ground surface using a paving material, and may comprise a chassis, a hopper, and a distribution device configured to dispense paving material on the ground surface. The paving machine may further comprise a main screed having a frame with a fixed width, and an extension screed that may extend laterally from the main screed into an extended position. The extension screed may include at least one extender tube that has a shell comprised of a first material with a second material disposed therein that restricts flexion of the extender tube when the extension screed is in the extended position.

In accordance with another aspect of the present disclosure, a screed assembly for use with a paving machine is disclosed. The screed assembly may comprise a main screed having a frame with a fixed width, and an extension screed that may extend laterally from the main screed into an extended position. The extension screed may include an inner plate proximate a central axis of the main screed, an outer plate opposite the inner plate, and at least one extender tube extending between the inner plate and the outer plate. The at least one extender tube may have a shell comprised of a first material with a second material disposed therein that offers increased stiffness to the at least one extender tube.

In accordance with yet another aspect of the present disclosure, a method of paving using a main screed and an extension screed is disclosed. The extension screed may have at least one extender tube with a shell comprised of a first material. The method may comprise filling the at least one extender tube with a second material, such that the second material restricts flexion of the at least one extender tube when the extension screed is in an extended position. The method may further comprise attaching the at least one filled extender tube to the extension screed, extending the extension screed to a fully-extended position, and paving a portion of a ground surface with the extension screed.

These and other aspect and features of the present disclosure will be better understood upon reading the following detailed description when taken in conjunction with the accompanying drawings.

BRIEF DESCRIPTION OF THE DRAWINGS

FIG. 4 is a flowchart of an embodiment of a series of steps for paving using a main screed and an extension screed, in accordance with a method of the present disclosure.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
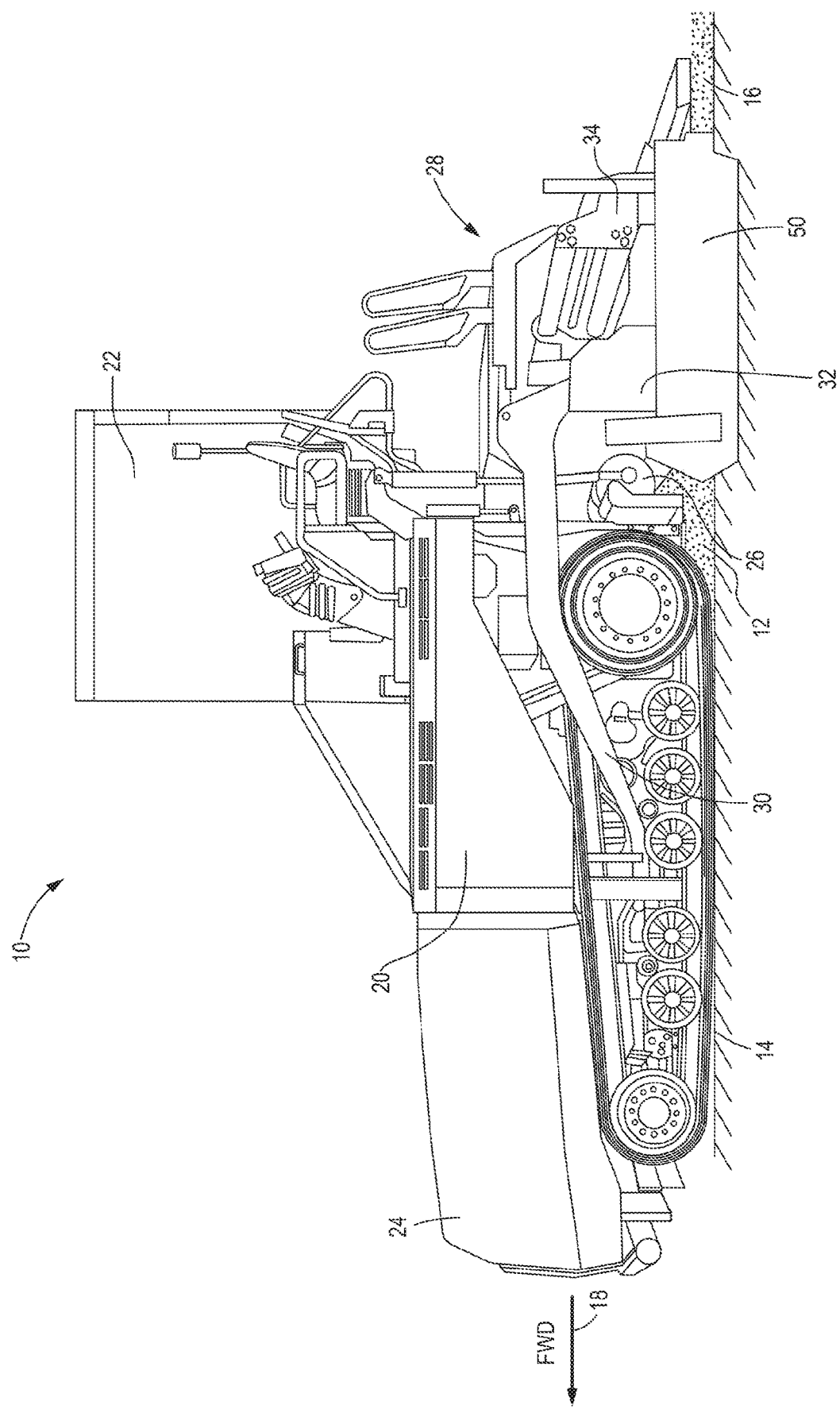
FIG. 1 is a side view of a paving machine having a screed assembly, constructed in accordance with the present disclosure.

FIG. 1 illustrates a side view of a paving machine 10, according to an embodiment of the present disclosure. The paving machine 10 may be used to level and compact a paving material 12, such as asphalt, on a surface of the ground 14 to provide a layer 16 of paved material. In the illustrated embodiment, the paving machine 10 is a track-equipped paver; however, in other embodiments, the paving machine may be a wheel-equipped paver. As used herein, a "front" position refers to a frontward position on the paving machine 10 in a forward direction of travel 18, while a "rear" position refers to a rearward position on the paving machine 10 with respect to the direction of travel. The paving machine 10 generally includes a chassis 20, as well as a passenger cab 22 mounted on the chassis. A hopper 24, disposed adjacent the front end of the paving machine 10, stores the paving material 12, and a distributing device 26, such as an auger, distributes the paving material 12 onto the ground surface 14.

The paving machine 10 further includes a screed assembly, indicated generally at 28, configured to level and compact the paving material 12 on the ground surface 14. The screed assembly 28 is disposed at a rear end of the paving machine 10, and is mounted to the chassis 20 via one or more arms 30. The screed assembly 28 includes a main screed 32 and one or more extension screeds 34 that extend laterally from the main screed with respect to a central axis 35 of the screed assembly (see FIG. 2).

Figure 2:
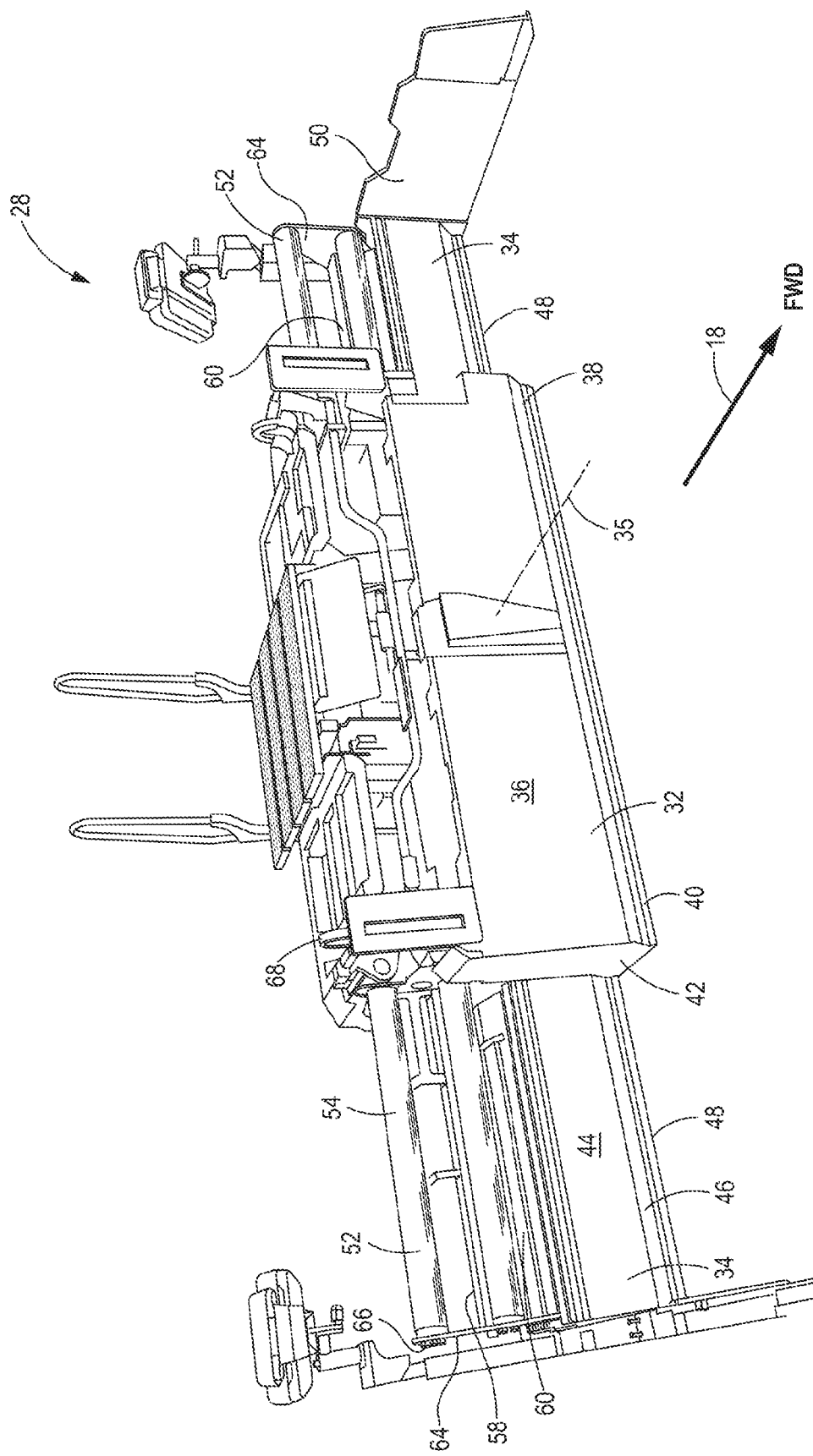
FIG. 2 is a front perspective view of the screed assembly of FIG. 1 shown in isolation in a fully-extended position, constructed in accordance with the present disclosure.
Figure 3:
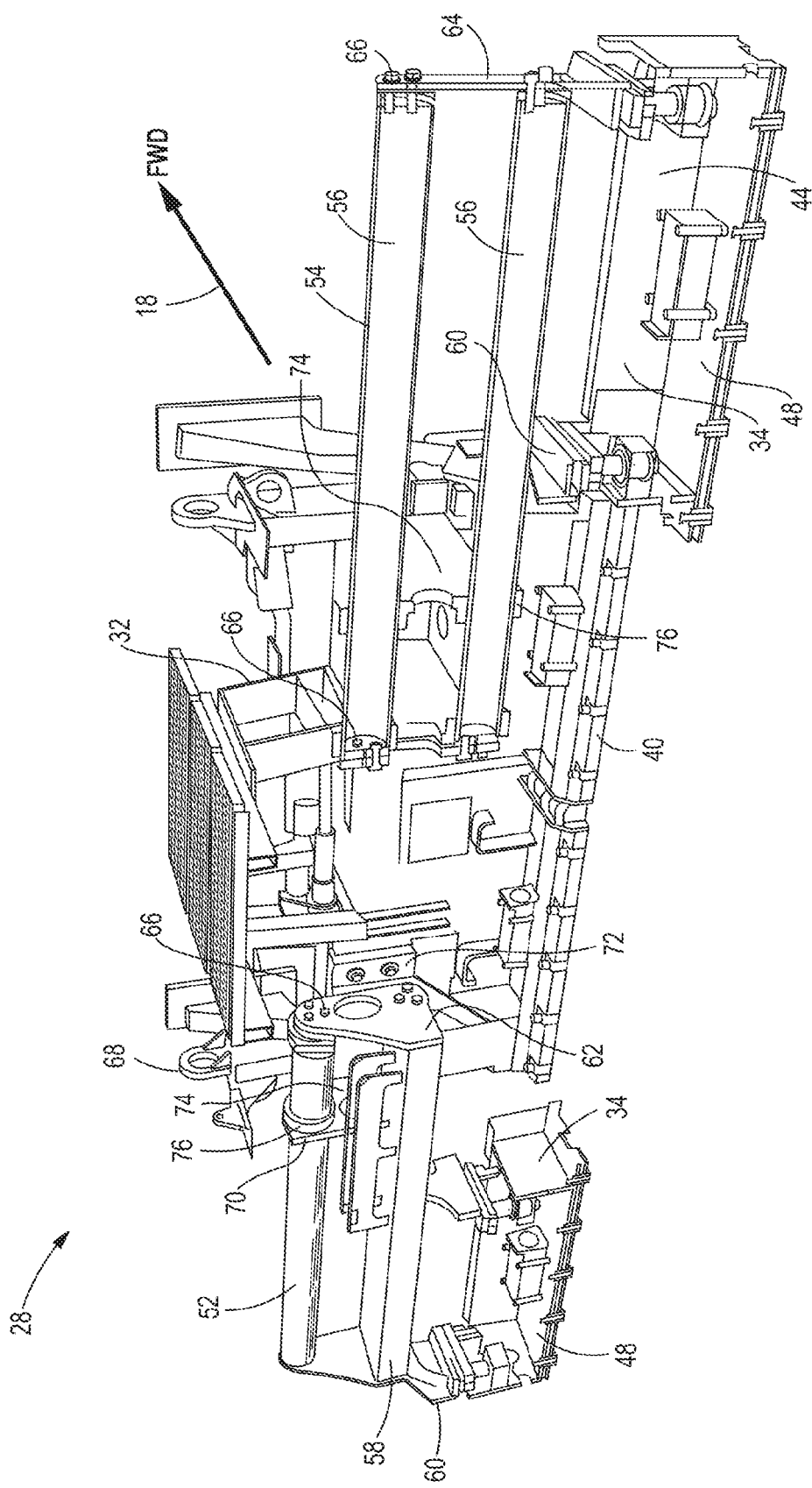
FIG. 3 is a rear perspective partial sectional view of the screed assembly of FIG. 1 shown in isolation in a fully-extended position, constructed in accordance with the present disclosure.

Referring to FIG. 2, a front perspective view of the screed assembly 28 is shown in more detail. In the depicted arrangement, the screed assembly 28 includes the main screed 32 and a pair of extension screeds 34. While a pair of extension screeds 34 are shown, other arrangements may include a single extension screed, or more than two extension screeds. In addition, the extension screeds 34 may be positioned axially behind the main screed 32, as shown. The main screed 32 is centrally located, and the extension screeds 34 are movably connected to the main screed. To adjust for variations in the width of the ground surface 14, the extension screeds 34 may be extended or retracted using an actuating mechanism (e.g. a hydraulic cylinder, etc.) For example, each of the extension screeds 34 may be extended laterally outward, away from the central axis 35 of the main screed 32, into a fully-extended position (FIGS. 1-3). Similarly, each of the extension screeds 34 may be retracted laterally inward, toward the central axis 35 of the main screed 32, into a fully-retracted position (not shown). The extension screeds 34 may also be positioned at a range of intermediate positions between the fully-retracted position and the fully-extended position, as needed.

The main screed 32 includes a generally vertical deflector 36, and may also include a tamper bar 38 positioned near a bottom edge of the deflector 36, that moves vertically up and down to pre-compact the paving material 12 in front of the main screed 32. The tamper bar 38 of the main screed 32 may be connected to a main screed plate 40, that also moves vertically up and down to compact the paving material 12 in front of the main screed. The main screed plate 40 is arranged horizontally at the bottom of the main screed 32, and may contact and compact the paving material 12 at a set "angle of attack" (i.e., the angle that the main screed plate makes with the ground surface 14), as will be understood by those with ordinary skill in the art of paving machines. In addition, the main screed 32 includes side plates 42 mounted at, and defining, laterally outward sides of the main screed. The side plates 42 are oriented perpendicular to the deflector 36.

Similar to the main screed 32 assembly, each of the extension screeds 34 includes a generally vertical deflector 44, and may also include a tamper bar 46 positioned near a bottom edge of the deflector 44, that moves vertically up and down to pre-compact the paving material 12 in front of the extension screed 34. Each extension screed 34 may also include an extension screed plate 48, connected to the tamper bar 46 of the extension screed, that moves vertically up and down to compact the paving material 12 in front of the extension screed. To prevent paving material 12 from flowing beyond a desired working width of the ground surface 14, each extension screed 34 is fitted with an end gate 50. Each end gate 50 is mounted at a laterally outer end of each extension screed 34 and extends toward the front of the paving machine 10 in the direction of travel 18, beyond the surface of the deflector 36 of the main screed 32. In addition, as will be understood by those skilled in the art, the extension screeds 34 are vertically adjustable with respect to the main screed 32 to adjust paving uniformity.

Referring now to FIGS. 2 and 3, each extension screed 34 includes one or more extender tubes 52, which stabilize the extension screed 34 while it is in an extended position and during a process of paving by the paving machine 10. The ability of the extension screed 34 to resist deflection, torsion, and/or roll while in an extended position is heavily reliant upon the stiffness of the extender tubes 52. For these reasons, each of the extender tubes 52 has an outer shell 54 made from a rigid material such as a metal or a metallic alloy (e.g. steel). To increase the stiffness and rigidity of the extender tubes 52 while the extension screed 34 is in an extended position, each extender tube 52 is filled with a compression-resistant material 56. Such compression-resistant material 56 may include compounds that have an initial fluidity, such that at the time of manufacture of the extender tube 52, the compression-resistant material may be injected into the extender tube, filling the outer shell 54. However, after a period of time, the compression-resistant material 56 may cure or harden within the extender tube 52, and therein provide added stabilization and rigidity to the extender tube. The compression-resistant material 56 may include, but is not limited to, a foam, an epoxy, concrete, or other compounds with similar attributes.

The extender screeds 34 include an upper extender frame 58 and a lower extender frame 60. Each extender tube 52 is installed in the upper extender frame 58, between a laterally inner plate 62 positioned proximate the central axis 35 of the main screed 32, and a laterally outer plate 64 positioned opposite the inner plate. Each end of the extender tube 52 may be securely fixed to one of the inner 62 and outer 64 plates using at least one fastener 66, such as a bolt. To ensure a secure attachment, each fastener 66 extends through the plate 62, 64 toward the extender tube 52, through the outer shell 54 of the extender tube, and into the compression-resistant material 56.

The deflector 44, tamper bar 46, and extension screed plate 48 are fixedly attached to the lower extender frame 60. The lower extender frame 60 is fixed (e.g. welded) to the upper extender frame 58 to provide added stability during paving.

As shown in more detail in FIG. 3, the main screed 32 includes a fixed-width rigid frame 68 with a plurality of mounting assemblies 70 securely fixed to the main screed frame to support the extender tubes 52 of the extension screed 34. Each mounting assembly 70 includes a mounting plate 72 and at least one bracket plate 74 that extends toward the rear of the paving machine 10. Each bracket plate 74 includes at least one aperture 76 dimensioned to accommodate reciprocation of an extender tube 52. For added stability and support of the extension screed 34 while in an extended position, and during reciprocation between extended and retracted positions, each extender tube 52 may extend through at least two bracket plates 74 and two apertures 76.

INDUSTRIAL APPLICABILITY

In practice, the teachings of the present disclosure may find applicability in many industries including, but not limited to, construction and earth moving equipment. As one particular example, the present disclosure may be beneficial to paving machines, and more particularly to paving machines having extension screeds. The present disclosure provides a paving machine with greatly reduced extension screed deflection with less weight and lower cost of manufacture than prior art paving machines.

A series of steps involved in paving the ground surface 14 using the main screed 32 and the extension screed 34 having at least one extender tube 52 with an outer shell 54 is illustrated in a flowchart format in FIG. 4. As shown therein, in a first step 100, the at least one extender tube 52 is filled with the compression-resistant material 56. This may be accomplished through any means known in the art for filling a tube with a material, including, but not limited to, injecting the compression-resistant material 56 into the extender tube 52, filling the outer shell 54. The compression-resistant material 56 may include a foam, an epoxy, concrete, but other compounds can certainly be employed.

In a second step 102, the compression-resistant material 56 is cured or dried, such that, after curing, the compression resistant material increases stiffness and reduces flexion of the extender tube 52 when the extension screed 34 is in an extended position.

Once filled and cured, the extender tube 52 is installed, in step 104, within the screed assembly 28. Each extender tube 52 may be installed to the frame 68 of the main screed 32 by slidably inserting the extender tube through one aperture 76 of the bracket plate 74. Each extender tube may also be installed in the upper extender frame 58 of the extension screed 34 by being fastened (e.g. using bolts) at one end to the inner plate 62 and at an opposite end to the outer plate 64 of the upper extender frame.

In step 106, the extension screed 34 may be extended from a fully-retracted position to an extended position to adjust for a variation in the width of the ground surface 14. This step may be accomplished using an actuating mechanism (e.g. a hydraulic cylinder, etc.), or by any other means known in the art. Specifically, the extension screed 34 may be extended laterally outward, away from the central axis 35 of the main screed 32, into a fully-extended position (FIGS. 1-3), or may be positioned at a range of intermediate positions between the fully-retracted position and the fully-extended position.

As the paving machine 10 travels in the forward direction, a portion of the paving material 12 is permitted to flow from the distributing device 26, toward the main screed 32 and the extension screed 34. The paving material 12 in front of the extension screed 34 may be pre-compacted with the tamper bar 46, and then paved under the extension screed plate 48 according to a next step 108.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A paving machine for paving a ground surface, the paving machine comprising:
   a chassis;
   a hopper;
   a distribution device configured to dispense paving material on the ground surface; and
   a screed assembly including a main screed having a rigid frame with a fixed width, an extension screed configured to extend laterally from the main screed, and a hydraulic cylinder to actuate the extension screed between a retracted position to an extended position, the extension screed including an extender tube movable relative to the main screen when then extension screed is actuated, having a shell comprised of a first material with a second curable material disposed therein, the second material restricting flexion of the extender tube when the extension screed is in the extended position.

2. The paving machine of claim 1, wherein the extension screed further includes an upper frame and a lower frame, wherein an upper edge of the lower frame is fixed to a lower edge of the upper frame by welding.

3. The paving machine of claim 2, the upper frame including an inner plate proximate a central axis of the main screed and an outer plate opposite the inner plate, wherein the extender tube is installed between the inner plate and the outer plate.

4. The paving machine of claim 3, wherein an inner end of the extender tube is fastened to the inner plate by means of a bolt, and an outer end of the extender tube opposite the inner end is fastened to the outer plate by means of a bolt.

5. The paving machine of claim 2, wherein the lower frame includes a deflector assembly including a deflector, a tamper bar, and a paving plate.

6. The paving machine of claim 1, wherein the main screed frame includes a plurality of tube mounting bracket plates, each tube mounting bracket plate extending in an axially rearward direction from the main screed frame, each tube mounting bracket plate having a plurality of apertures, each aperture dimensioned to accommodate one extender tube.

7. The paving machine of claim 6, wherein the extender tube is disposed in at least two tube mounting bracket plates.

8. The paving machine of claim 1, further including an actuating mechanism for selectively extending and retracting the extension screed between the extended position and the retracted position.

9. The paving machine of claim 1, wherein the first material is comprised of a metal.

10. The paving machine of claim 1, wherein the second material offers increased stiffness to the extender tube and is comprised of a foam, an epoxy, or concrete.

11. A screed assembly for use with a paving machine, the screed assembly comprising:
    a main screed having a rigid frame with a fixed width; and
    an extension screed configured to extend laterally from the main screed between a retracted position to an extended position, the extension screed having a lower frame including a deflector assembly, an upper frame including a tube mounting assembly, and an extender tube fixed within the tube mounting assembly and having a shell comprised of a first material with a second curable material disposed therein, the second material offering increased stiffness to the extender tube.

12. The screed assembly of claim 11, wherein the tube mounting assembly includes an inner plate proximate a central axis of the main screed and an outer plate opposite the inner plate.

13. The screed assembly of claim 12, wherein a first end of the extender tube is fixed to the inner plate by means of a bolt, and a second end of the extender tube opposite the first end is fixed to the outer plate by means of a bolt.

14. The paving machine of claim 11, wherein the deflector assembly includes a deflector, a tamper bar, and a paving plate.

15. The screed assembly of claim 11, wherein the main screed frame includes a plurality of tube mounting brackets, each tube mounting bracket having a plurality of apertures, each aperture dimensioned to accommodate one extender tube.

16. The screed assembly of claim 15, wherein the extender tube is disposed in at least two tube mounting brackets.

17. The screed assembly of claim 11, further including an actuating mechanism for selectively extending and retracting the extension screed.

18. The screed assembly of claim 11, wherein the first material is comprised of a metal, and the second material restricts flexion of the extender tube and is comprised of a foam, an epoxy, or concrete.

19. A method of paving using a screed assembly including a main screed and an extension screed, the extension screed having an extender tube with a shell comprised of a first material, the method comprising:
   filling the extender tube with a second material;
   curing the second material, the cured second material restricting flexion of the extender tube when the extension screed is in an extended position;
   installing the cured extender tube to the screed assembly;
   extending the extension screed from a fully-retracted position to an extended position; and
   paving a portion of a ground surface with the screed assembly.

20. The method of paving of claim 19, wherein the first material is comprised of a metal, and wherein the second material offers increased stiffness to the extender tube and is comprised of a foam, an epoxy, or concrete.

* * * * *